United States Patent
Yamaguchi

(10) Patent No.: US 11,644,087 B2
(45) Date of Patent: May 9, 2023

(54) DRIVE TRANSMISSION DEVICE AND IMAGE FORMING DEVICE

(71) Applicant: KYOCERA Document Solutions Inc., Osaka (JP)

(72) Inventor: Akihiro Yamaguchi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 170 days.

(21) Appl. No.: 17/189,559

(22) Filed: Mar. 2, 2021

(65) Prior Publication Data
US 2021/0277981 A1 Sep. 9, 2021

(30) Foreign Application Priority Data
Mar. 3, 2020 (JP) .............................. JP2020-036021

(51) Int. Cl.
*F16H 7/02* (2006.01)
*G03G 21/16* (2006.01)
*F16H 55/36* (2006.01)
*G03G 15/00* (2006.01)

(52) U.S. Cl.
CPC .............. *F16H 7/02* (2013.01); *F16H 55/36* (2013.01); *G03G 15/757* (2013.01); *G03G 21/1647* (2013.01)

(58) Field of Classification Search
CPC ...... F16H 55/36; F16H 2055/366; F16H 7/02; F16H 2055/363; F16G 1/20; G03G 15/757
USPC .......................................................... 474/167
See application file for complete search history.

(56) References Cited

U.S. PATENT DOCUMENTS

| | | | | |
|---|---|---|---|---|
| 894,126 A * | 7/1908 | Eloesser | ................. | F16H 55/36 474/272 |
| 2,056,844 A * | 10/1936 | Farrand | ..................... | F16H 7/02 474/167 |
| 2,966,065 A * | 12/1960 | Renner | ................ | B65G 39/071 198/813 |
| 3,478,609 A * | 11/1969 | Beindorf | ................... | F16H 7/02 474/142 |
| 3,490,285 A * | 1/1970 | Walter | ...................... | F16H 7/12 474/187 |
| 3,851,535 A * | 12/1974 | Presentey | ............... | F16H 55/36 474/166 |
| 4,813,525 A * | 3/1989 | Rangert | .................. | B27B 17/10 192/105 BA |

(Continued)

FOREIGN PATENT DOCUMENTS

JP 2014-159866 9/2014

*Primary Examiner* — Henry Y Liu
(74) *Attorney, Agent, or Firm* — Lex IP Meister, PLLC

(57) ABSTRACT

A drive transmission device is provided with a drive pulley driven by a motor, a driven pulley in which a bulging part crowned in a shape bulging outward in the radial direction is formed over the entire circumference of the outer peripheral surface, a belt wound around the drive pulley and the driven pulley, and a first measurement unit for measuring rotation unevenness of the drive pulley. The drive pulley has a uniform diameter in the axial direction which is a smaller diameter than that of the driven pulley. The belt is bent and deformed along the bulging part of the driven pulley so that the axial center portion is expanded outward the axial end portion. The axial end of the belt contacts the outer peripheral surface of the drive pulley, but does not contact the outer peripheral surface of the driven pulley.

6 Claims, 5 Drawing Sheets

(56) References Cited

U.S. PATENT DOCUMENTS

| | | | | |
|---|---|---|---|---|
| 4,991,784 A * | 2/1991 | Schmid | B65H 23/02 | 242/585 |
| 4,995,855 A * | 2/1991 | Hasebe | F16H 7/02 | 474/167 |
| 5,214,472 A * | 5/1993 | Czuprynski | F16G 1/20 | 474/272 |
| 5,411,444 A * | 5/1995 | Nakamura | F16H 55/36 | 474/167 |
| 5,784,676 A * | 7/1998 | Iseki | G03G 15/1655 | 399/9 |
| 6,419,208 B1 * | 7/2002 | Baranda | B66B 15/04 | 254/390 |
| 6,488,123 B2 * | 12/2002 | Pitts | D07B 1/148 | 187/254 |
| 7,712,592 B2 * | 5/2010 | Jansen | F16D 7/022 | 474/902 |
| 9,010,495 B2 * | 4/2015 | Prasad | B66B 15/04 | 254/390 |
| 9,285,752 B2 * | 3/2016 | Okuno | G03G 15/757 | |
| 9,423,002 B2 * | 8/2016 | Yamaguchi | F16G 1/20 | |
| 2004/0100550 A1 | 5/2004 | Bannai | H04N 1/506 | 347/234 |
| 2006/0192804 A1 * | 8/2006 | Nakata | B41J 29/38 | 347/16 |
| 2009/0238588 A1 * | 9/2009 | Matsuda | G03G 15/0194 | 399/46 |
| 2009/0310986 A1 * | 12/2009 | Izu | G03G 15/5079 | 399/302 |
| 2011/0013919 A1 * | 1/2011 | Matsuda | G03G 15/1615 | 399/167 |
| 2011/0293329 A1 * | 12/2011 | Konishi | F16H 7/02 | 399/167 |
| 2012/0051788 A1 * | 3/2012 | Tsuji | G03G 15/757 | 399/167 |
| 2013/0256982 A1 * | 10/2013 | Kawanago | G03G 15/6561 | 271/225 |
| 2014/0064752 A1 * | 3/2014 | Tsuji | G03G 15/55 | 474/84 |
| 2014/0072340 A1 * | 3/2014 | Kato | G03G 15/1605 | 399/302 |
| 2014/0235384 A1 * | 8/2014 | Yamaguchi | F16H 57/0489 | 474/93 |
| 2014/0235392 A1 * | 8/2014 | Yamaguchi | G03G 21/1647 | 474/148 |
| 2014/0270827 A1 * | 9/2014 | Muto | G03G 15/5058 | 399/49 |
| 2014/0274506 A1 * | 9/2014 | Lannutti | F16H 55/36 | 474/70 |
| 2015/0043942 A1 * | 2/2015 | Okuno | G03G 15/757 | 399/167 |
| 2015/0233445 A1 * | 8/2015 | Yamaguchi | G03G 15/757 | 474/272 |
| 2015/0277322 A1 * | 10/2015 | Doshida | G03G 15/5008 | 399/167 |
| 2016/0138700 A1 * | 5/2016 | Hauck | F16H 55/36 | 474/94 |
| 2016/0332820 A1 * | 11/2016 | Lord | B65G 39/16 | |

* cited by examiner

DRIVE TRANSMISSION DEVICE AND IMAGE FORMING DEVICE

INCORPORATION BY REFERENCE

This application is based upon and claims the benefit of priority from the corresponding Japanese Patent Application No. 2020-036021 filed on Mar. 3, 2020, the entire contents of which are incorporated herein by reference.

BACKGROUND

The present disclosure relates to a drive transmission device for transmitting a driving force using a belt, and an image forming apparatus including the drive transmission device.

An electrophotographic type image forming apparatus is provided with a photosensitive drum as an image carrier. A drive transmission device in which a metal belt is wound around a drive shaft or a drive pulley on the motor side and a driven pulley on the photosensitive drum side is generally used as a device for transmitting a drive force to the photosensitive drum.

However, in the drive transmission device, the belt is damaged or meandered by long-term use, which adversely affects the durability of the belt and the rotational speed of the photosensitive drum. When the belt is broken, the transmission of the driving force becomes impossible, and there is a problem that a down time in which the image forming apparatus cannot be used occurs.

Therefore, a technique for suppressing the meandering of the belt has been studied for a long time. For example, there is a technique of suppressing meandering caused by a change in the circumferential length of a belt due to thermal expansion, by cooling the belt.

SUMMARY

A drive transmission device according to one aspect of the present disclosure is provided with a drive pulley driven by a motor, a driven pulley in which a bulging part crowned in a shape bulging outward in the radial direction is formed over the entire circumference of the outer peripheral surface, a belt wound around the drive pulley and the driven pulley, and a first measurement unit for measuring rotation unevenness of the drive pulley. The drive pulley has a uniform diameter in the axial direction which is a smaller diameter than that of the driven pulley. The belt is bent and deformed along the bulging part of the driven pulley so that the axial center portion is expanded outward the axial end portion. The axial end of the belt contacts the outer peripheral surface of the drive pulley, but does not contact the outer peripheral surface of the driven pulley.

The image forming apparatus according to one aspect of the present disclosure includes the drive transmission device and a photosensitive drum connected to the driven pulley.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, a printer 1 (an example of an image forming apparatus) and a drive transmission device 31 according to the present disclosure will be described with reference to the drawings.

Figure 1:
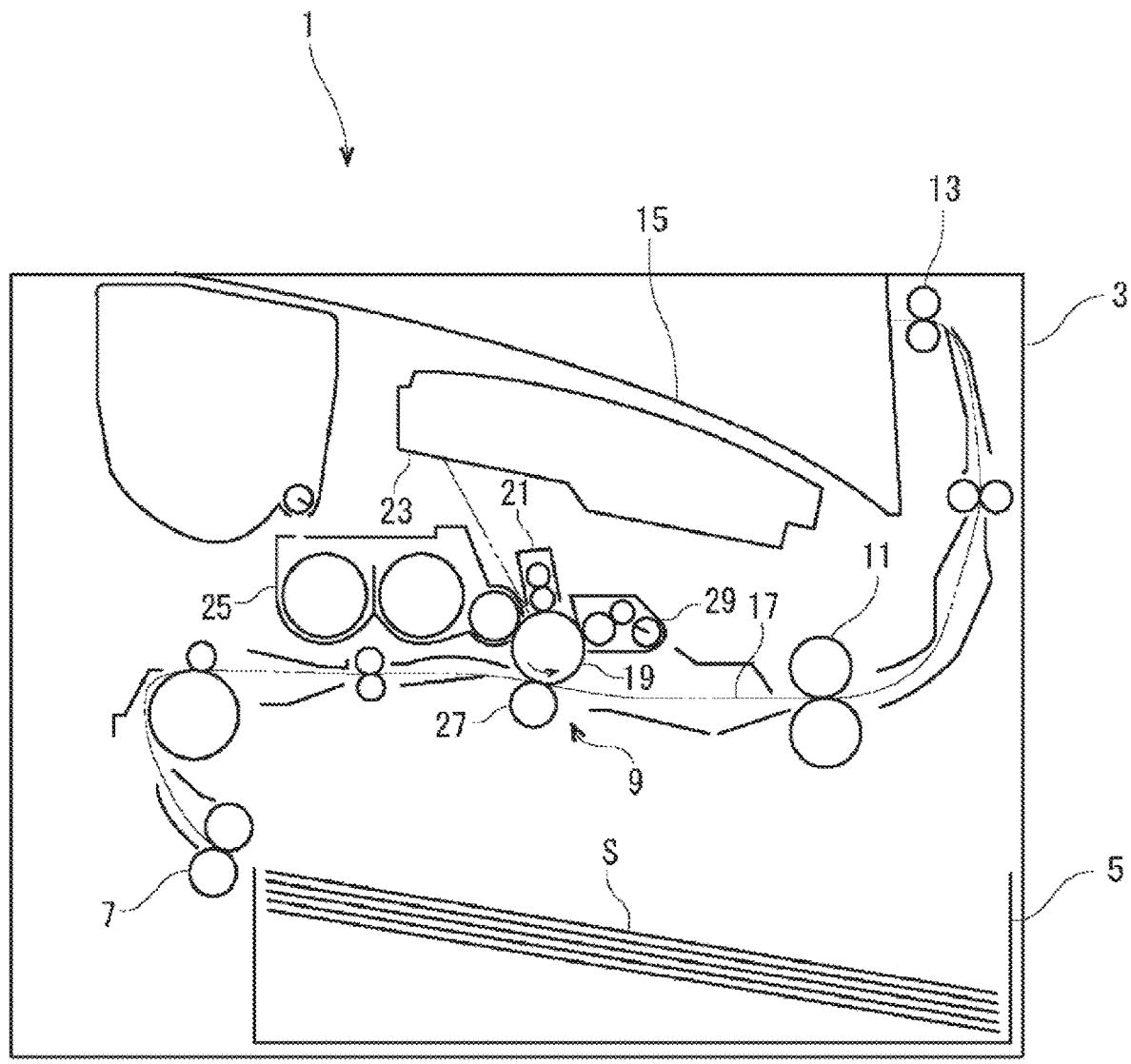
FIG. 1 is a front view schematically showing an internal configuration of a printer according to an embodiment of the present disclosure.
Figure 1:
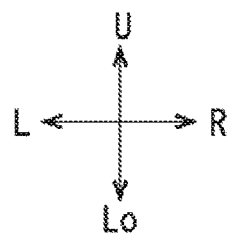

Firstly, with reference to FIG. 1, an entire structure of the printer 1 as an image forming apparatus will be described. FIG. 1 is a front view schematically showing an inner structure of the printer 1. In the following description, a near side (a front side) of a paper surface of FIG. 1 is defined to be a front side of the printer 1, and a left-and-right direction is defined based on a direction in which the printer 1 is viewed from the front side. In each figure, U, Lo, L, R, Fr and Rr respectively show an upper side, a lower side, a left side, a right side, a front side and a rear side.

A main body housing 3 of a printer 1 is provided with a paper feeding cassette 5 in which a sheet S is stored, a paper feeding roller 7 which feeds the sheet S from the paper feeding cassette 5, an image forming unit 9 which forms a toner image on the sheet S, a fixing device 11 which fixes the toner image on the sheet S, a discharge roller 13 which discharges the sheet S, and a discharge tray 15 on which the discharged sheet S is stacked. In the main body housing 3, a conveying path 17 is formed from the paper feeding roller 7 through the image forming unit 9 and the fixing device 11 to the discharge roller 13.

The image forming unit 9 includes a photosensitive drum 19, a charge device 21, an exposure device 23, a development device 25, a transfer roller 27 and a cleaning device 29. The photosensitive drum 19 is driven by a drive transmission device 31, described later, to be rotated in the clockwise direction in FIG. 1. The charge device 21, the development device 25, the transfer roller 27 and the cleaning device 29 are disposed around the photosensitive drum 19 in the rotational direction of the photosensitive drum 19.

The sheet S fed from the paper feeding cassette 5 by the paper feeding roller 7 is conveyed to the image forming unit 9 along the conveying path 17, and the photosensitive drum 19 is charged to a predetermined potential by the charge device 21. Thereafter, the photosensitive drum 19 is exposed by the exposure device 23 to form an electrostatic latent image thereon. Next, the electrostatic latent image is developed by the development device 25 to form a toner image. Then, the toner image is transferred on the sheet S by the transfer roller 27. The sheet S onto which the toner image has been transferred is sent to the fixing device 11 along the conveying path 17, and the toner image is fixed to the sheet S by the fixing device 11. The sheet S on which the toner image has been fixed is stacked on the discharge tray 15 by the discharge roller 13. The toner remaining on the surface of the photosensitive drum 19 is removed by the cleaning device 29.

Figure 2:
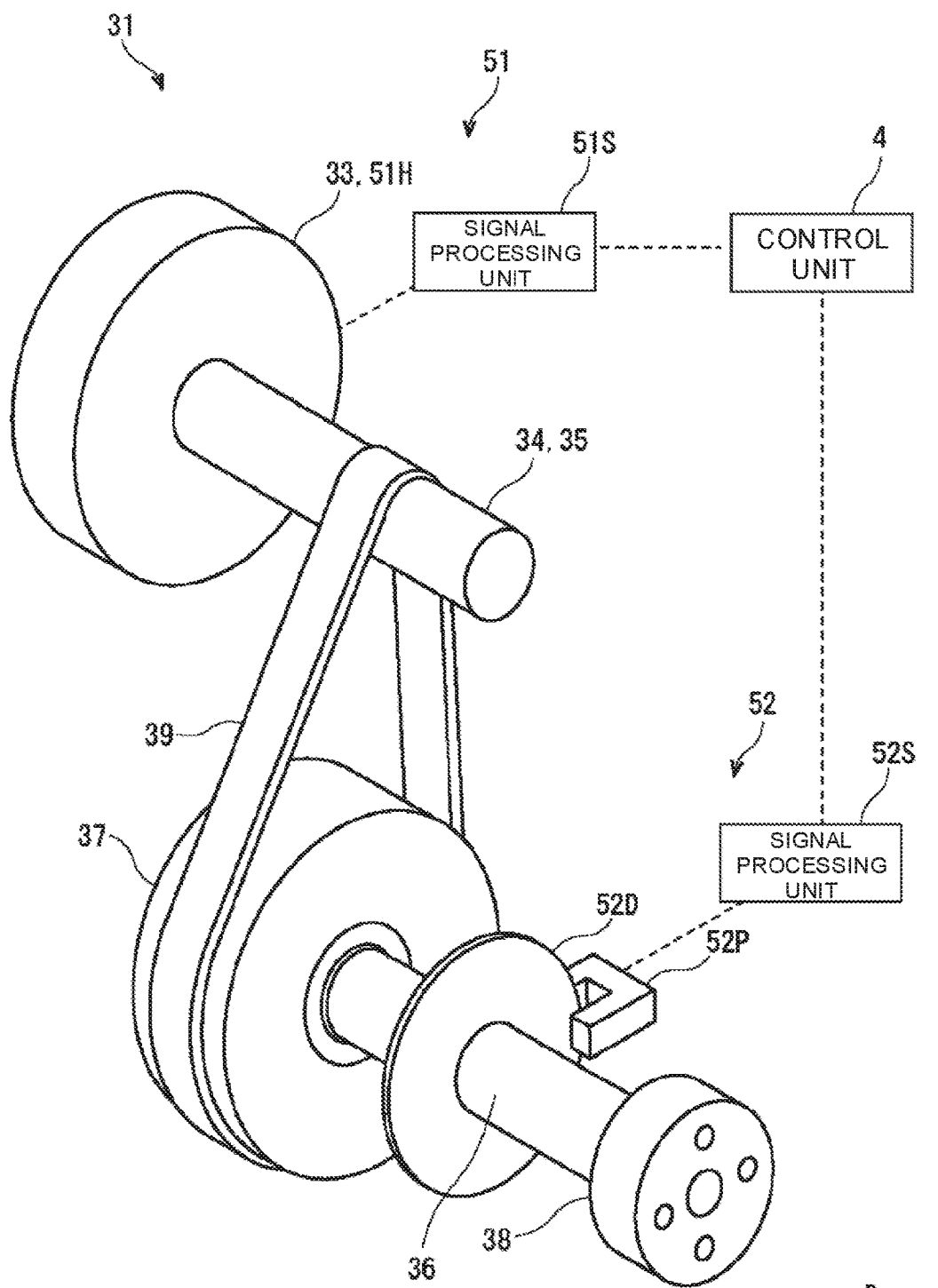
FIG. 2 is a perspective view of a drive transmission device according to an embodiment of the present disclosure.
Figure 2:
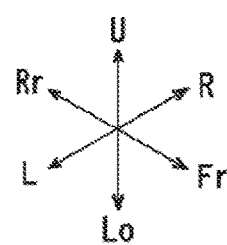
Figure 3:
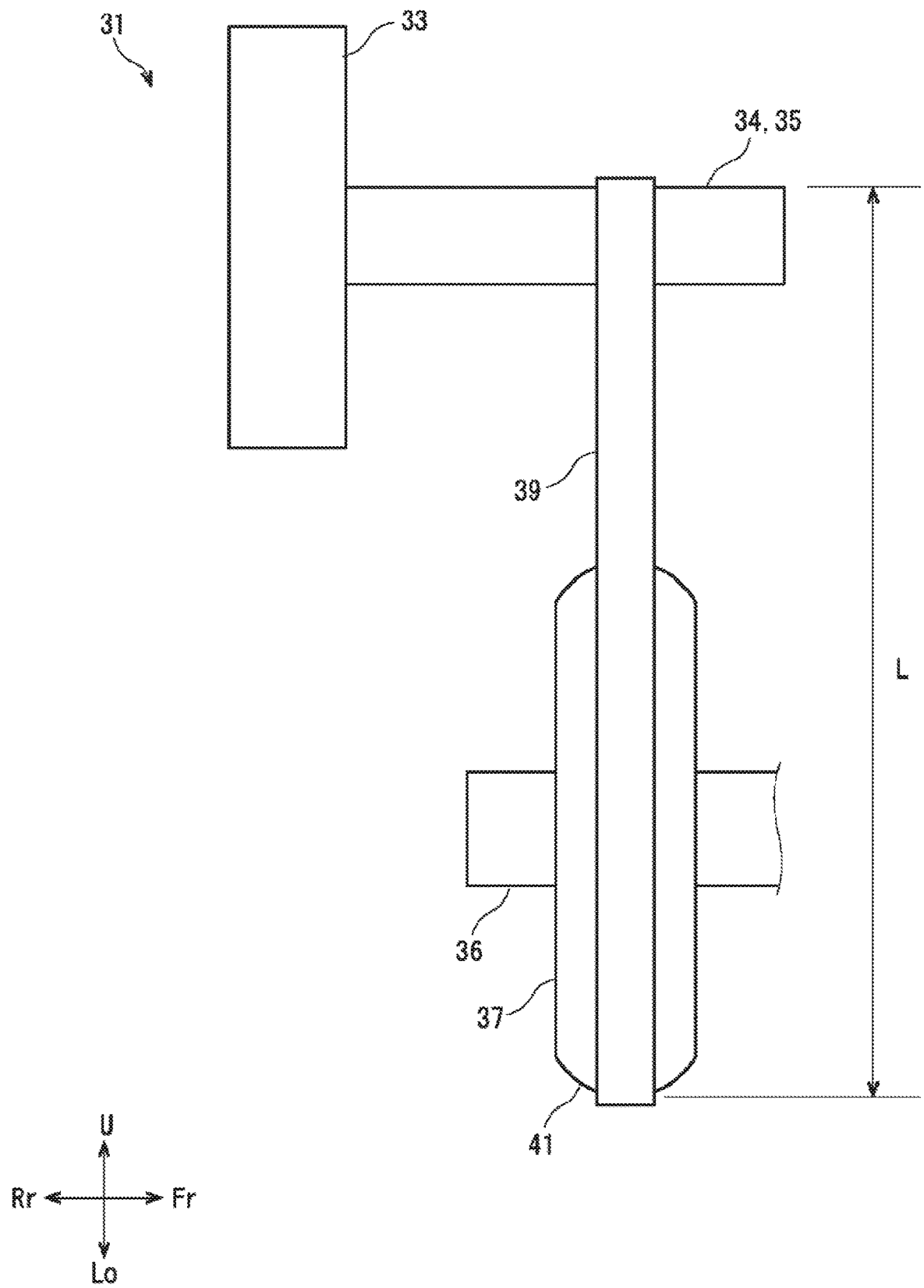
FIG. 3 is a left side view of a drive transmission device according to an embodiment of the present disclosure.
Figure 4:
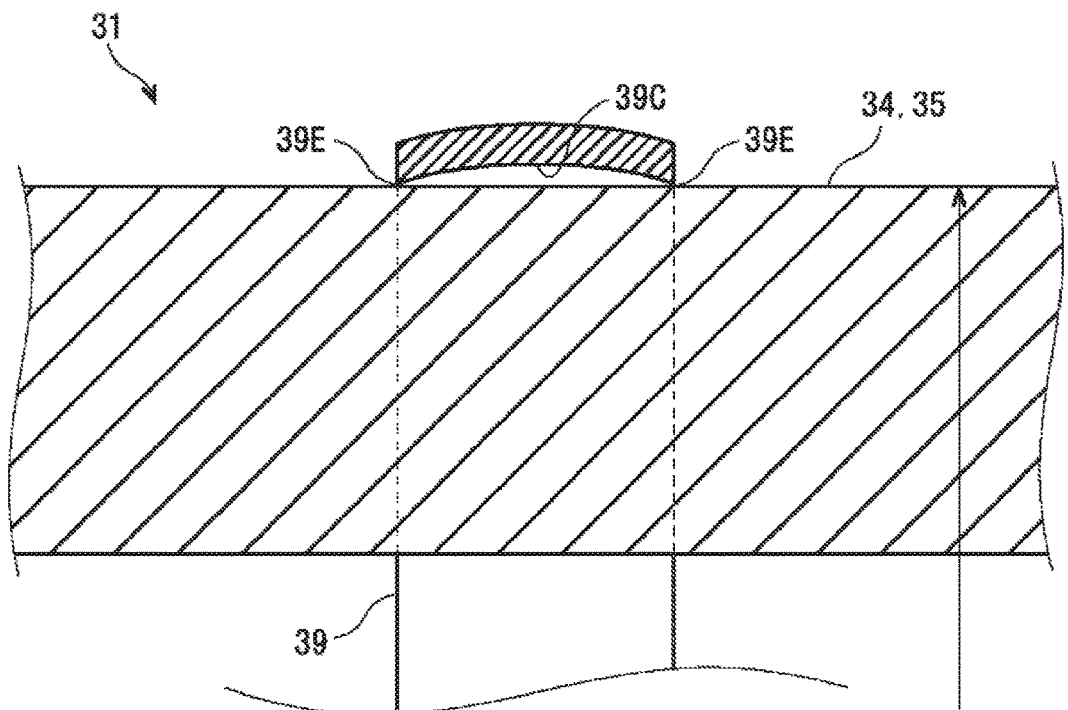
FIG. 4 is a cross-sectional view of a drive pulley, a driven pulley and a belt according to an embodiment of the present disclosure.
Figure 4:
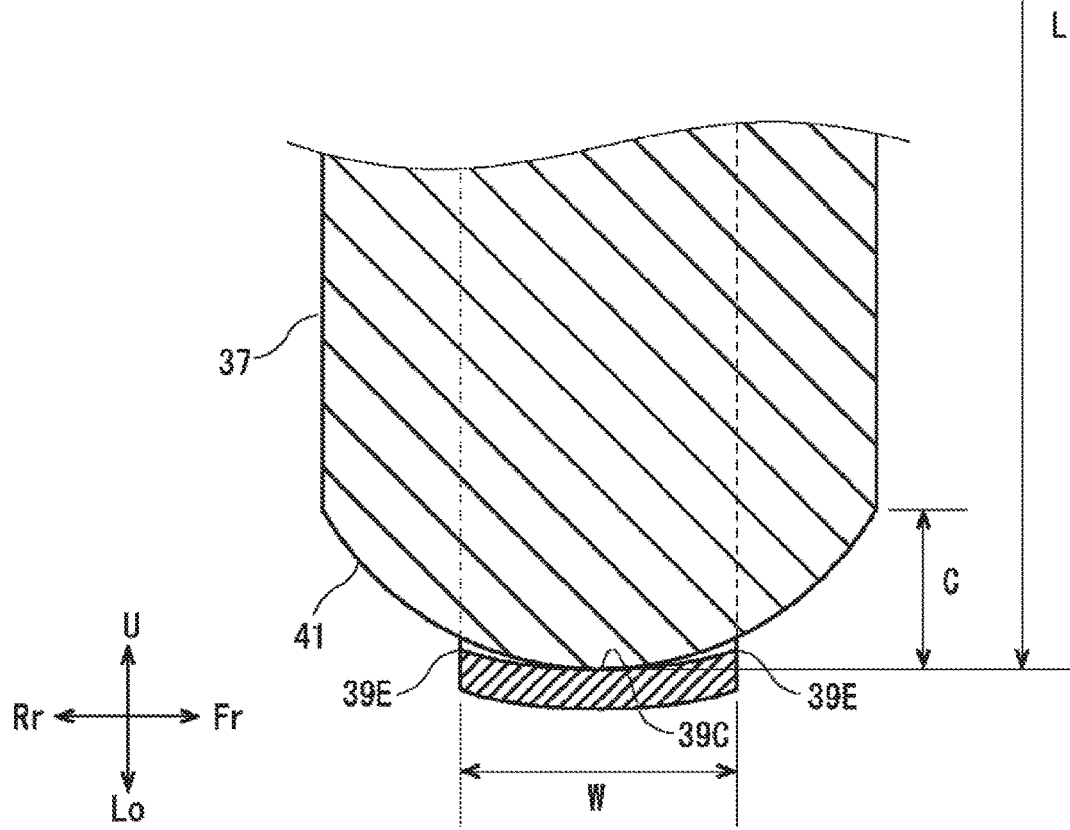

Next, with reference to FIGS. 2 to 4, the structure of the drive transmission device 31 will be described. FIG. 2 is a perspective view of the drive transmission device 31. FIG.

3 is a left side view of the drive transmission device 31. FIG. 4 is a sectional view of the drive pulley 35, the driven pulley 37 and the belt 39.

The drive transmission device 31 is disposed behind the photosensitive drum 19 and is supported by a housing (not shown) fixed to the main body housing 3. In the following example, the drive transmission device 31 is arranged in a posture in which the driven shaft 36 is positioned below the drive shaft 34, but the drive transmission device 31 may be arranged in another posture.

[Drive Pulley]

The motor 33 is a brushless motor, and is supported by the housing with the front and rear direction as the axial direction of the drive shaft 34. The drive shaft 34 also functions as a drive pulley 35 for driving the belt 39. The drive pulley 35 is not crowned and has a uniform diameter in the axial direction. In order to relax stress concentration of the belt 39, the diameter of the drive pulley 35 is preferably 8 mm or more. In order to generate tension in the belt 39, the motor 33 is urged upward by an urging mechanism (not shown) using a spring or the like.

[Driven Pulley]

The driven pulley 37 is provided on the driven shaft 36. The driven shaft 36 is provided at a position spaced downward from the drive shaft 34 with the front and rear direction as the axial direction. Both front and rear ends of the driven shaft 36 are supported by bearings (not shown) fixed to the housing. A shaft coupling 38 is provided at a front end portion of the driven shaft 36, and the driven shaft 36 and the shaft of the photosensitive drum 19 are connected via the shaft coupling 38.

[Belt]

The belt 39 is a seamless endless belt, is formed of a non-magnetic metal material (for example, SUS304), and is wound around the drive pulley 35 and the driven pulley 37. When the motor 33 rotates, a driving force is transmitted through the drive pulley 35 and the belt 39 to rotate the driven pulley 37.

Next, a function of detecting damage to the axial end portion 39E of the belt 39 will be described. Long-term use may result in damage to the axial end portion 39E of the belt 39, such as cracking, chipping, or deformation. If these damages are left unattended, the belt 39 may be broken. When the damaged portion comes into contact with the drive pulley 35 or the driven pulley 37, the distribution of the stress changes, so that the rotation unevenness increases. In addition, in the drive transmission device 31 configured as the speed reduction device, since the diameter of the drive pulley 35 is smaller than that of the driven pulley 37, the time for which the drive pulley 35 comes into contact with the damaged portion is shorter. Therefore, the peak of the increase in the rotational unevenness due to the contact of the damaged portion is more sensitive in the drive pulley 35. Therefore, in the present embodiment, the damage of the axial end portion 39E of the belt 39 is detected by measuring rotation unevenness of the drive pulley 35.

A drive transmission device 31 is provided with a drive pulley 35 driven by a motor 33, a driven pulley 37 in which a bulging part 41 crowned in a shape bulging outward in the radial direction is formed over the entire circumference of the outer peripheral surface, a belt 39 wound around the drive pulley 35 and the driven pulley 37, and a first measurement unit 51 for measuring rotation unevenness of the drive pulley 35. The drive pulley 35 has a uniform diameter in the axial direction and has a smaller diameter than that of the driven pulley 37. The belt 39 is bent and deformed along the bulging part 41 of the driven pulley 37 so that the axial center portion 39C is bulged outward beyond the axial end portion 39E. The axial end portion 39E of the belt 39 contacts the outer peripheral surface of the drive pulley 35, but does not contact the outer peripheral surface of the driven pulley 37. The details are as follows.

In the driven pulley 37, the bulging part 41 crowned in a shape bulging outward in the radial direction is formed over the entire circumference of the outer peripheral surface. The bulging part 41 has the largest diameter at the center portion in the axial direction and is formed in a plane-symmetrical shape with the center portion in the axial direction as a symmetrical plane. Note that it is not necessary to have plane symmetry. The crown amount C (the difference in diameter between the portion having the largest diameter and the portion having the smallest diameter) of the bulging part 41 is preferably 0.3 mm or more and 0.5 mm or less. If the crown amount C is less than 0.3 mm, it is difficult to obtain the effect of correcting the meandering of the belt 39, and if the crown amount C is more than 0.5 mm, the belt 39 tends to fall off.

When the belt 39 is driven, the section of the belt 39 which is in contact with the driven pulley 37 is bent and deformed along the bulging part 41 of the driven pulley 37 so that the axial center portion 39C swells outward the axial end portion 39E. Due to the influence of the bending deformation, bending deformation of the same shape remains in the section of the belt 39 which is not in contact with the driven pulley 37. Although the bending deformation is relaxed as the distance from the driven pulley 37 increases, under certain conditions the bending deformation remains even in the section in contact with the drive pulley 35. However, if the end portion 39E in the axial direction of the belt 39 in the axial direction is in contact with the outer peripheral surface of the driven pulley 37, the outer peripheral surface is scraped, and there is a risk that the axial end portion 39E of the belt 39 may be damaged due to an increase in the surface roughness of the outer peripheral surface. Therefore, it is necessary that the axial end portion 39E of the belt 39 does not contact the outer peripheral surface of the driven pulley 37.

When the distance between pulleys necessary for realizing this state was determined by an experiment, it was found that the distance L (see FIG. 3) between the point farthest from the driven pulley 37 on the outer peripheral surface of the drive pulley 35 and the point farthest from the drive pulley 35 on the outer peripheral surface of the driven pulley 37 was required to be 25 times or less the width W of the belt 39. When the distance L exceeds 25 times the width W, the bending deformation of the belt 39 (the shape in which the axial center portion 39C swells outward the axial end portion 39E) almost disappears near the drive pulley 35, and the entire inner peripheral surface of the belt 39 comes into surface contact with the drive pulley 35. Therefore, the influence of the damage of the axial end portion 35E on the rotational speed of the drive pulley 35 becomes difficult to appear, and it becomes difficult to detect the damage of the axial end portion 39E. However, when the distance L is less than 8 times, since the relaxation of the bending deformation in the vicinity of the drive pulley 35 is small, the bending stress becomes excessive due to the combination with the circumferential bending deformation of the drive pulley 35, and the life of the belt 39 may be shortened.

As described above, when the crown amount C is not less than 0.3 mm and not more than 0.5 mm and the distance L is not less than 8 times and not more than 25 times the width W, the axial end portion 39E of the belt 39 comes into contact with the outer peripheral surface of the drive pulley 35, but does not come into contact with the outer peripheral surface of the driven pulley 37, and a decrease in the rotational speed of the belt 39 is avoided.

[First Measurement Unit]

The first measurement unit 51 includes, for example, a plurality of Hall elements 51H arranged inside the motor 33 and a signal processing unit 51S. The Hall elements 51H are arranged at equal intervals in the rotational direction around a rotor (not shown) of the motor 33, and output FG (Frequency Generator) pulse signals in accordance with the strength of the magnetic field changing with the rotation of the rotor. The signal processing unit 51S includes, for example, an F/V converter for outputting a voltage proportional to the frequency of the FG pulse signal, and an FFT analyzer for analyzing the frequency of the outputted voltage (not shown). Then, the FG pulse signal is analyzed to calculate the rotational unevenness of the drive pulley 35, and data indicating the rotational unevenness is output to the control unit 4. The rotational unevenness is expressed by the ratio of the actual rotational speed to the set rotational speed.

[Control Unit]

The drive transmission device 31 is controlled by the control unit 4. The control unit 4 may be implemented by a processor and software, or may be implemented by hardware such as an integrated circuit. The processor executes various processes by reading and executing programs stored in the memory. As the processor, for example, a CPU (Central Processing Unit) is used. The memory includes a storage medium such as a ROM (Read Only Memory), a RANI (Random Access Memory), and an EEPROM (Electrically Erasable Programmable Read Only Memory). A control program used for controlling the drive transmission device 31 is stored in the memory.

The signal processing unit 51S of the first measurement unit 51 is connected to the control unit 4. In addition, the control unit 4 is connected to a service center via a communication line, and can transmit and receive data to and from the service center.

Figure 5:
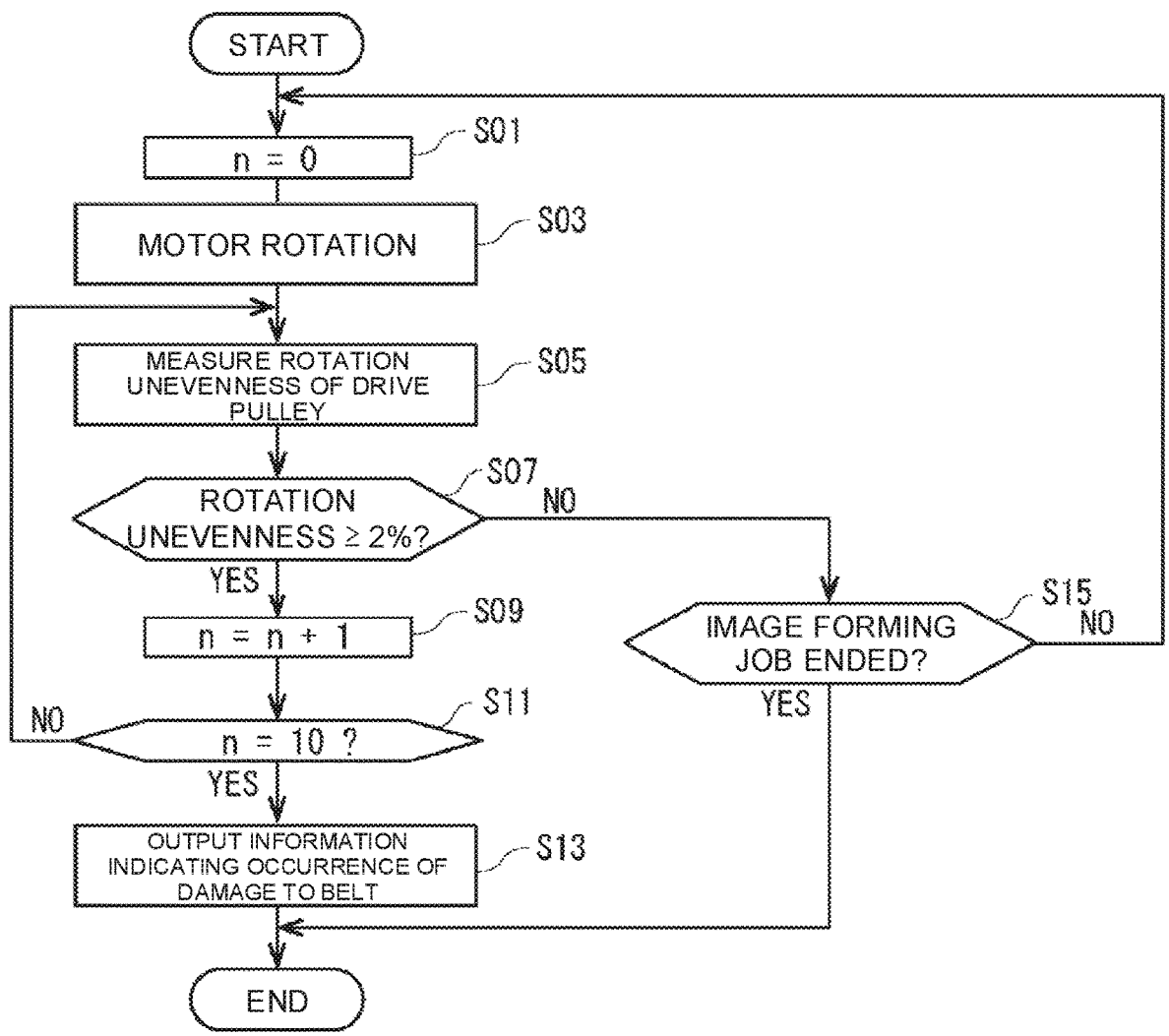
FIG. 5 is a flowchart showing an operation of a drive transmission device according to an embodiment of the present disclosure.

FIG. 5 is a flowchart showing the operation of the drive transmission device 31. When an image forming job is input to the printer 1, the control unit 4 executes the following damage detection processing. First, the control unit 4 initializes the counter n for accumulating the number of times the rotation unevenness of the threshold value or more is measured to 0 (step S01), and rotates the drive pulley 35 by the motor 33 (step S03).

Next, the control unit 4 measures the rotation unevenness of the drive pulley 35 (Step S05), and determines whether or not the rotational unevenness is equal to or greater than the threshold value (Step S07). In the present embodiment, as an example, the threshold value of the rotational unevenness is set to 2%. If the control unit 4 determines that the rotation unevenness is 2% or more (step S07:YES), the process proceeds to step S09, and if the rotational unevenness is determined to be less than 2% (step S07:NO), the process proceeds to step S15.

In step S09, the control unit 4 adds 1 to the counter n and determines whether or not n has reached 10 (step S11). When it is determined that n has reached 10 (step S11:YES), the control unit 4 transmits information indicating that damage has occurred to the belt 39 to the service center (step S13), and ends the damage detection processing. If it is determined that n has not reached 10 (step S11:NO), the control unit 4 repeats the processing from step S05.

On the other hand, in step S15, the control unit 4 determines whether or not the image forming job has ended. If it is determined that the image forming job has ended (step S15:YES), the control unit 4 ends the damage detection processing, and if it is determined that the image forming job has not ended (step S15:NO), the control unit 4 repeats the processing from step S01.

If both the drive pulley 35 and the driven pulley 37 are crowned, the effect of preventing meandering is higher than that in the case where one of them is crowned, but there is a possibility that an excessive bending stress is generated in the belt 39 on the pulley side having a small diameter. For this reason, in the drive transmission device 31 configured as the speed reduction device, it is common that only the driven pulley 37 having a large diameter is crowned. In this case, it is necessary that the axial end portion 39E of the belt 39 does not contact the outer peripheral surface of the driven pulley 37. However, in such a case, even if the end portion 39E of the belt 39 is damaged, the damaged portion does not contact the outer peripheral surface, and therefore, even when the rotational unevenness of the driven pulley 37 is measured, the damage cannot be detected.

On the other hand, the drive transmission device 31 according to the present embodiment includes a first measurement unit 51 for measuring the rotational unevenness of the drive pulley 35, and the drive pulley 35 has a uniform diameter in the axial direction which is a smaller diameter than that of the driven pulley 37. The belt 39 is bent and deformed along the bulging part 41 of the driven pulley 37 into a shape in which the axial center portion 39C of the belt 39 bulges outward beyond the end portion 39E, and the axial end portion 39E of the belt 39 contacts the outer peripheral surface of the drive pulley 35 but does not contact the outer peripheral surface of the driven pulley 37. Therefore, damage to the axial end portion 39E of the belt 39 can be detected from the uneven rotation of the drive pulley 35. In addition, the belt 39 can be prevented from meandering.

According to the drive transmission device 31 according to the present embodiment described above, it is possible to prevent the belt 39 from meandering and detect the damage of the belt 39 with high accuracy.

In addition, According to the drive transmission device 31 of the present embodiment, the crown amount C of the bulging part 41 of the driven pulley 37 is 0.3 mm or more 0.5 mm or less, and the distance L between the point farthest from the driven pulley 37 on the outer peripheral surface of the drive pulley 35 and the point farthest from the drive pulley 35 on the outer peripheral surface of the driven pulley 37 is 8 times or more to 25 times or less the width W of the belt 39. Therefore, it is possible to realize a state in which the axial end portion 39E of the belt 39 contacts the outer peripheral surface of the drive pulley 35 but does not contact the outer peripheral surface of the driven pulley 37.

In addition, according to the drive transmission device 31 of the present embodiment, the control unit 4 determines the presence or absence of damage to the axial end portion 39E of the belt 39 from the rotational irregularity measured by the first measurement unit 51, and outputs information indicating the damage to the belt 39, so that measures can be taken before the belt 39 is broken.

[Modification]

The above-described embodiment may be modified as follows.

In addition to the configuration of the above-described embodiment, a second measurement unit 52 may be provided. The second measurement unit 52 is, for example, an optical rotary encoder, and includes a light shielding plate 52D, a photo-interrupter 52P, and a signal processing unit 52S. The light shielding plate 52D is a disk in which a plurality of slits (not shown) extending radially are formed at equal intervals in the rotational direction of the driven shaft 36, and is fixed to the driven shaft 36. The photointerrupter 52P is fixed to the housing and outputs a pulse signal whose level is alternately changed by the rotation of the light shielding plate 52D. The signal processing unit 52S includes, for example, an F/V converter for converting the frequency of the pulse signal into a voltage, and an FFT analyzer for calculating the frequency distribution of the signal by fast Fourier transform (not shown). Then, the rotation speed of the driven pulley 37 is calculated by analyzing the pulse signal, and data indicating the rotation speed is output to the control unit 4. The control unit 4 performs feedback control of the motor 33 so that the difference between the rotational speed measured by the second measurement unit 52 and the set rotational speed falls within a predetermined range. According to this configuration, it is possible to improve the driving accuracy of the driven pulley 37.

In the above-described embodiment, there has been shown an example in which the control unit 4 accumulates the number of times that the rotational unevenness of 2% or more has been measured, and determines that the belt 39 has been damaged when the number of times reaches 10. However, in addition to this configuration, the control unit 4 may measure the generation cycle of the rotational unevenness of 2% or more and determine that the belt 39 has been damaged when the difference between the generation cycle and the designed rotation cycle of the belt 39 is equal to or less than the threshold value. According to this configuration, it is possible to improve the accuracy of detecting the damage of the belt 39.

In addition, the control unit 4 may be configured to stop driving the motor 33 when the tendency of increase of the value of the rotational unevenness by 2% or more is exhibited. According to this configuration, it is possible to prevent the belt 39 from being broken.

In addition, the control unit 4 may also be configured to store the number of occurrences of damage during 1 rotation of the belt 39, and to stop driving of the motor 33 when the tendency of increase of the number of occurrences is exhibited. According to this configuration, it is possible to prevent the belt 39 from being broken.

In the above-described embodiment, the first measurement unit 51 includes a plurality of Hall elements 51H and a signal processing unit 51S disposed inside the motor 33. However, the first measurement unit 51 may be an optical rotary encoder or the like.

In the above-described embodiment, when the belt 39 is driven, the section of the belt 39 which is in contact with the driven pulley 37 is bent and deformed to a shape in which the axial central portion 39C bulges outward along the bulging part 41 of the driven pulley 37 beyond the axial end portion 39E. However, the belt 39 may be formed in a shape in which the axial center portion 39C is expanded outward the end portion 39E, in advance.

What is claimed is:

1. A drive transmission device comprising:
a drive pulley driven by a motor;
a driven pulley in which a bulging part crowned in a shape bulging outward in the radial direction is formed over the entire circumference of an outer peripheral surface;
a belt wound around the drive pulley and the driven pulley; and
a first measurement unit for measuring rotation unevenness of the drive pulley,
wherein the drive pulley has a uniform diameter in the axial direction which is a smaller diameter than that of the driven pulley,
wherein the belt is bent and deformed along the bulging part of the driven pulley so that the axial center portion is expanded outward the axial end portion, and
wherein the axial end of the belt contacts an outer peripheral surface of the drive pulley, but does not contact the outer peripheral surface of the driven pulley, and
wherein a crown amount of the bulging part of the driven pulley is 0.3 mm or more 0.5 mm or less, and a distance between the point farthest from the driven pulley on the outer peripheral surface of the drive pulley and the point farthest from the drive pulley on the outer peripheral surface of the driven pulley is 8 times or more to 25 times or less a width of the belt.

2. A drive transmission device comprising:
a drive pulley driven by a motor;
a driven pulley in which a bulging part crowned in a shape bulging outward in the radial direction is formed over the entire circumference of an outer peripheral surface;
a belt wound around the drive pulley and the driven pulley;
a first measurement unit for measuring rotation unevenness of the drive pulley; and
a control unit for outputting information indicating damage to the belt,
wherein the drive pulley has a uniform diameter in the axial direction which is a smaller diameter than that of the driven pulley,
wherein the belt is bent and deformed along the bulging part of the driven pulley so that the axial center portion is expanded outward the axial end portion,
wherein the axial end of the belt contacts an outer peripheral surface of the drive pulley, but does not contact the outer peripheral surface of the driven pulley, and
wherein the presence or absence of damage to the axial end portion of the belt is determined from the rotational unevenness measured by the first measurement unit.

3. A drive transmission device comprising:
a drive pulley driven by a motor;
a driven pulley in which a bulging part crowned in a shape bulging outward in the radial direction is formed over the entire circumference of an outer peripheral surface;
a belt wound around the drive pulley and the driven pulley;
a first measurement unit for measuring rotation unevenness of the drive pulley; and
a second measurement unit for measuring rotation unevenness of the driven pulley,
wherein the drive pulley has a uniform diameter in the axial direction which is a smaller diameter than that of the driven pulley,
wherein the belt is bent and deformed along the bulging part of the driven pulley so that the axial center portion is expanded outward the axial end portion,
wherein the axial end of the belt contacts an outer peripheral surface of the drive pulley, but does not contact the outer peripheral surface of the driven pulley, and
wherein the control unit controls the motor according to the rotation unevenness of the driven pulley measured by the second measurement unit, thereby reducing the rotation unevenness of the driven pulley.

4. An image forming apparatus comprising:
the drive transmission device according to claim 1; and
a photosensitive drum connected to the driven pulley.

5. An image forming apparatus comprising:
the drive transmission device according to claim 2; and
a photosensitive drum connected to the driven pulley.

6. An image forming apparatus comprising:
the drive transmission device according to claim 3; and
a photosensitive drum connected to the driven pulley.

* * * * *